United States Patent [19]

Fischer et al.

[11] 4,149,350

[45] Apr. 17, 1979

[54] ARRANGEMENT FOR MOUNTING AN ANCHORING ELEMENT

[75] Inventors: Artur Fischer, Weinhalde 34, D-7244 Waldachtal 3, (Tumlingen), Fed. Rep. of Germany; Klaus Fischer, Waldachtal, Fed. Rep. of Germany

[73] Assignee: Artur Fischer, Waldachtal, Fed. Rep. of Germany

[21] Appl. No.: 857,765

[22] Filed: Dec. 5, 1977

[30] Foreign Application Priority Data

Dec. 28, 1976 [DE] Fed. Rep. of Germany ....... 2659138

[51] Int. Cl.² .......................... F16B 39/00; E04B 1/41
[52] U.S. Cl. ..................................... 52/704; 151/41.7
[58] Field of Search ................. 52/704, 707, 127, 744; 151/41.7, 14.5; 85/63, 83; 175/209, 210, 220; 264/262, 328

[56] References Cited

U.S. PATENT DOCUMENTS

| 4,044,512 | 8/1977 | Fischer et al. ....................... | 52/704 X |
| 4,063,582 | 12/1977 | Fischer ............................... | 52/704 X |

*Primary Examiner*—J. Karl Bell

*Attorney, Agent, or Firm*—Michael J. Striker

[57] ABSTRACT

An arrangement for anchoring a mounting element in a hole of a masonry and the like with the use of binding material has a sleeve-shaped mounting element insertable in the hole and having an axis and an inner bore adapted to receive therein a threaded element, a plurality of retaining members arranged on the mounting element for fixing the latter in the hole, which retaining members extend transversely to the axis of the sleeve-shaped element and taper towards a wall of the hole, and a flange arranged at a trailing end of the mounting element so as to close a hole and having an opening for mounting a feeding device, feeding the binding material into the hole. The retaining members have throughgoing apertures through which the binding material flows so as to reliably fill the hole. The retaining members are preferably wedge-shaped. The feeding device may be inserted not only in the opening of the flange but also directly in the inner bore of the mounting element. An additional sheath may be provided for preventing escape of the binding material through a gap between the masonry and an additional structure to be mounted thereto.

17 Claims, 7 Drawing Figures

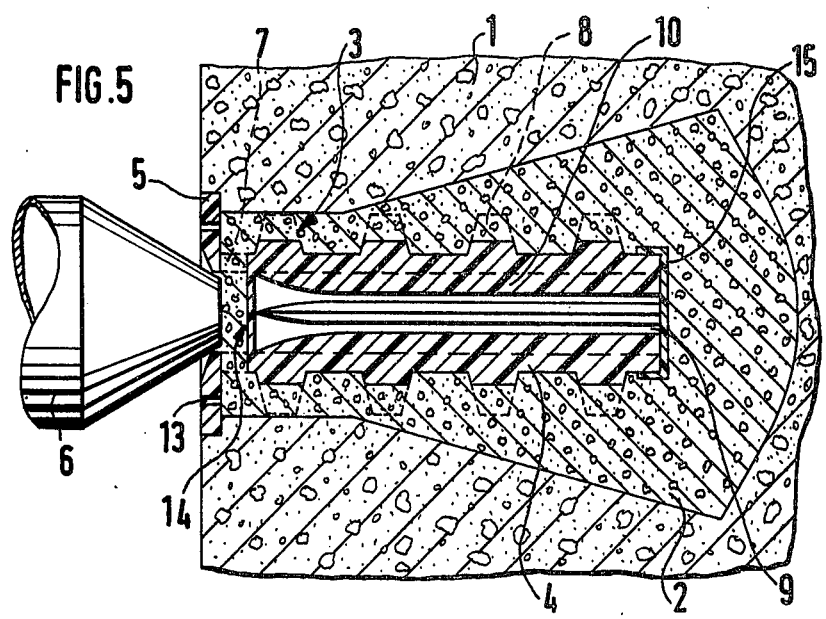
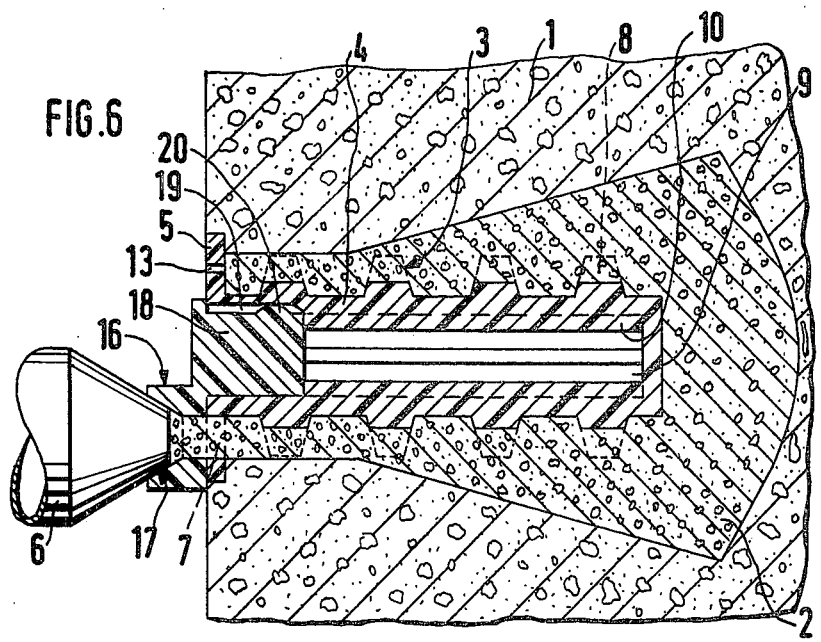

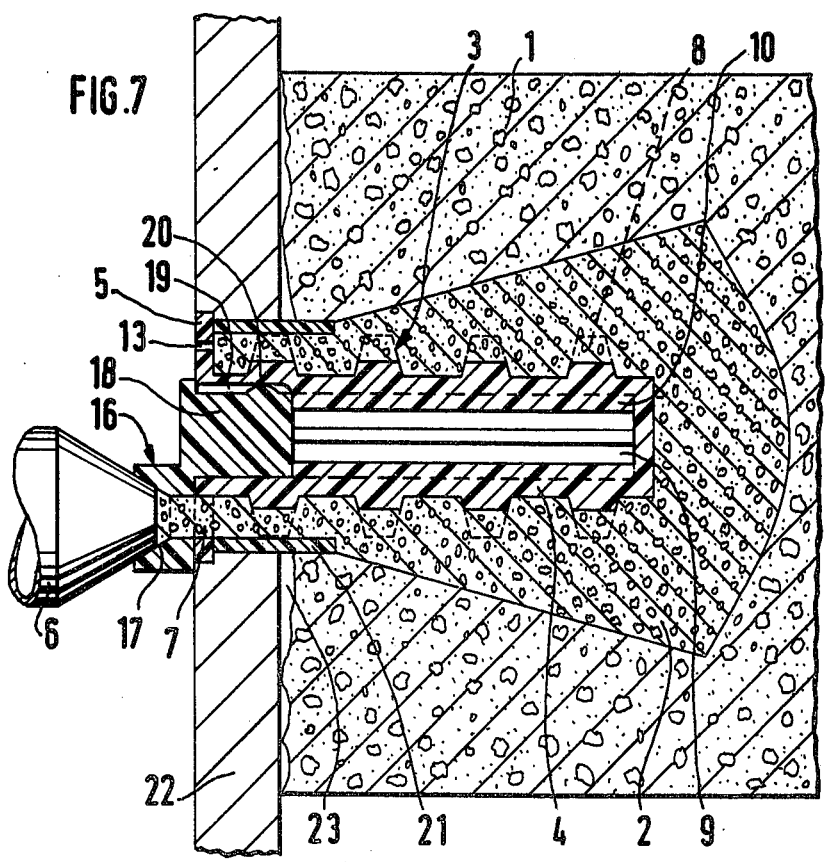

ARRANGEMENT FOR MOUNTING AN ANCHORING ELEMENT

BACKGROUND OF THE INVENTION

The present invention relates to an arrangement for anchoring a mounting element in a hole of a masonry or other structures and, more particularly, to anchoring a mounting element with the use of a hardenable binding material.

The prior art has encountered very serious difficulties when it is desired to mount an object by means of a mounting element anchoring on a low-strength support structure which is typically porous and usually have large vacant cavity areas. In such porous supporting structures having internal hollow cavities separated by partition walls, it has been proposed to utilize an extra-long dowel whose length is selected so that they can engage and grip several of the partition walls in the interior of the support structure. Thus, as a result of distributing the expansion pressure force over several partition walls, a large extraction force is required to remove an object from the support. However, even with this prior art approach, one still subjects the interior of the structure to some crumbling. Moreover, the higher anchoring value frequently necessary to mount an object on a support cannot always be achieved.

It has been also proposed particularly for anchoring mounting elements in porous supporting structures to use hardenable binding material. A hole having a considerably larger cross-section than the cross-sectional dimension of the mounting element is formed in the masonry. Then the mounting element is inserted into the hole and binding material is injected through an opening provided in a flange thereof. The binding material fills a cavity formed between the mounting element and a wall of the hole. The mounting element anchored in the hole has a sleeve-shaped body provided with a curved portion at a leading end thereof, and with an annular portion at a trailing end for fixing the mounting element in the hole. When the mounting element is anchored in the hole of the masonry, a threaded element may be threaded into the mounting element so as to support a structure to be mounted to the masonry.

It has been found that the above arrangements for anchoring mounting elements in holes of masonry are not satisfactory in some respects.

SUMMARY OF THE INVENTION

Accordingly, it is an object of the present invention to provide an arrangement for anchoring a mounting element in a hole of a masonry or the like with the use of binding material, which can be used in connection with threaded elements, such as wood screws, on the one hand, and can be manufactured simply and inexpensively with sufficient holding strength.

In keeping with these objects, and with others which will become apparent hereinafter, one feature of the present invention resides, briefly stated, in a sleeve-shaped mounting element provided with a plurality of retaining members which extend transversely to an axis of the mounting element and fix the latter in a hole of a masonry, which retaining members have through-going apertures and tapers towards a wall of the hole.

In order to anchor the above mounting element a hole is drilled in the masonry, which hole has a diameter corresponding to an outer diameter of the retaining members of the mounting element so that when the mouting element is inserted in the hole, it is fixed in the hole by the retaining members.

Preferably, the retaining members are formed on an outer surface of the mounting element, they are flange-like and spaced from one another in an axial direction, and they are of one piece with the mounting element.

Means for closing the hole is also provided, including a flange member arranged at a trailing end of the mounting element as considered in the direction of insertion of the latter into the hole. The flange member has a through-going opening for feeding binding material into the hole of the masonry. The flange member serves simultaneously for closing the hole so as to prevent backflow of the binding material therefrom, and also as a stop member for limiting the depth of insertion of the mounting element into the hole. A ventilating opening may be provided in the flange for additionally ventilating the hole, particularly for the cases when the masonry does not have inner cavities.

The retaining members preferably taper towards the wall of the hole so that they have a wedge-shaped configuration. In this case, a core of the binding material is formed by a plurality of segments which are connected by a section extending through the apertures of the retaining members and have a wedge-shaped configuration which widens towards the wall of the hole. Such segments offer high resistance to extraction owing to intimate connection with the wall of the hole. Since the retaining members are reinforced in regions adjacent to a body portion of the mounting element, the shearing strength of the retaining members is additionally increased, on the one hand, and the rigidity thereof prevents the mounting element from slipping when it is subjected to extraction force, on the other hand.

In addition, the extraction force acting in the axial direction is changed by the wedge-shaped retaining members into a force which acts normally to the faces of the retaining members and therefore is directed towards the wall of the hole. The friction of the core of the binding material against the wall of the hole is thereby additionally increased by an expansion force which presses the core of binding material against the wall of the hole so that a very high holding strength is obtained.

Another feature of the present invention is that the flange member may be formed with an extension extending in a direction transverse to the axis of the mounting element, in which extension the feeding opening may be at least partially formed. Such a construction is suitable for the cases when the mounting element has a relative small transverse dimension so that a gap between the mounting element is not sufficient for forming a feeding opening, such as when the mounting element is anchored in edge regions. Since the feeding opening should not have a dimension below a certain size due to the viscosity of the binding material, the feeding opening which is at least partially formed in the above extension of the flange member may have a required comparatively greater dimension. The extension may be formed as a radial extension.

In this construction the feeding opening must not be located in alignment with the gap between a body of the mounting element and the wall of the hole, and for this reason an outer dimension of the mounting element as measured over the retaining members can closely correspond to the outer dimension of the body thereof so that the hole may be only slightly larger than the outer dimension of the body of the mounting element. The thus-constructed mounting element can be anchored in edge regions, and, for example, in the end faces of thin-walled parts. One should care in this case that the mounting element must be so inserted in the hole that its extension is positioned in the region where the thickness of the material is relatively great.

Prior to introduction of the binding material into the hole, a passage must be formed in the masonry so as to communicate the feeding opening in the extension of the flange member with the hole. Since masonry material is porous and soft, this can be easily done by piercing thereof with a screwdriver, a nail and the like. After this, the binding material is injected through the feeding opening in the flange and through the thus-formed passage into the hole of the masonry. Thus, such an opening is available for feeding the binding material into the hole which is considerably larger than the gap between the body of the mounting element and the wall of the hole.

Still another feature of the present invention is that the inner bore of the mounting element is separated by a destructable partition wall into two sections located adjacent to the leading end and the trailing end of the mounting element, respectively. At least one feeding opening is formed in the wall of the trailing end section of the mounting element and may be located immediately behind the flange member. In this case it is possible to use the inner bore of the mounting element for injecting the binding material so that the mounting element may be of a considerably small size. A portion of the feeding device may be inserted into the trailing end section of the inner bore of the mounting element, and the binding material will be injected through the trailing end section into the feeding opening and thereafter into the hole.

The leading end section, that is, the major section of the inner bore is protected from entering of the binding material by the partition wall so that a threaded element can be subsequently threaded thereinto. In spite of the fact that for manufacturing reasons the leading end of the mounting element is open, the binding material is prevented from penetrating into the leading end portion of the inner bore by a cushion of air formed in the latter, at least to the extent sufficient for threading the threaded element therein. A tip of the threaded element which is threaded into the inner bore of the mounting element can crush and dislodge the binding material which is hardened between longitudinally extending ribs provided in the inner bore. Prior to this, the partition wall which may be formed as an injection-molded membrane, has to be pierced by a screwdriver, a nail or the like.

In accordance with a further feature of the present invention, an open leading end of the mounting element may be closed for example by a cap, which prevents the binding material from penetrating into the inner bore of the mounting element through the open leading end thereof.

A still further feature of the present invention is that an additional nozzle member may be provided, having one portion insertable into the inner bore of the mounting element, and another portion provided with an opening for insertion of a portion of the feeding device therein. It is especially preferable when the mounting element has very small dimensions and the feeding opening is correspondingly small so that the feeding device cannot be effectively positioned against the latter. Since the nozzle member is fixed relative to the feeding opening, the feeding device is effectively prevented from slipping off relative to the latter. The nozzle also effectively prevents the binding material from being squeezed during injecting into the hole. The nozzle and the wall of the inner bore of the mounting element may be provided with interengaging projections and recesses so as to assure that the nozzle member is aligned with the feeding opening of the flange member of the mounting element.

An additional feature of the present invention is that the arrangement may be provided with a sheath extending from the flange member over a portion of the length of the mounting element. When additional structure such as plaster-board panels and the like are mounted against the masonry, the binding material injected into the hole of the masonry may escape through a gap between the additional structure and the masonry. This results not only in the loss of the binding material but also leads to dirtying of an outer surface of the masonry. When the sheath is provided having a length exceeding the thickness of the additional structure so that its portion extends into the hole of the masonry, the above gap is bridged by the sheath and therefore the binding material cannot escape through the gap. The sheath located against the wall of the hole prevents the back-flow of the binding material and guides the latter when it flows in a cavity formed between the sheath and the mounting element. The sheath can be axially fixed by firmly clamping the same either in the bore or gainst the retaining members of the mounting element. The sheath may also be of one piece with the mounting element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 6 is a view showing a mounting element inserted in a hole, in accordance with still another embodiment of the present invention;

FIG. 6 is a view showing a mounting element in accordance with a further embodiment of the present invention; and FIG. 7 is a view showing a mounting element inserted in a hole, in accordance with a still further embodiment of the present invention.

DESCRIPTION OF THE PREFERRED EMBODIMENTS

Figure 1:
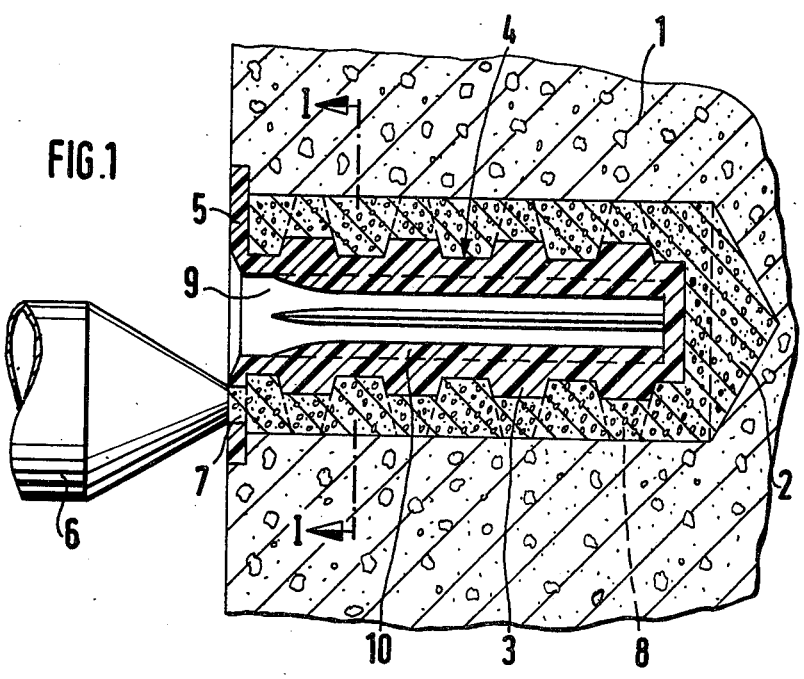
FIG. 1 is a view showing a mounting element in accordance with the present invention, inserted in a hole of a masonry or the like and surrounded by binding material injected into the hole.
Figure 2:
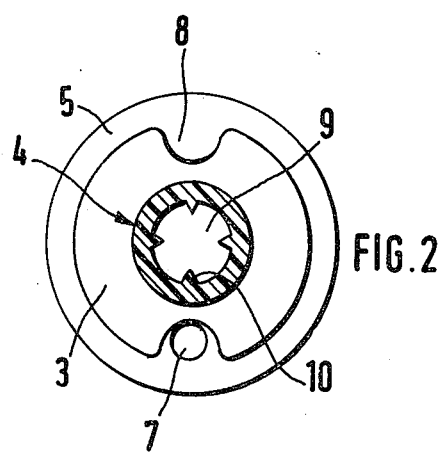
FIG. 2 is a view showing a section of the mounting element taken along the line II—Ii in FIG. 1.

In FIG. 1 of the drawing reference numeral 1 identifies a masonry in which a hole 2 is formed by boring or a similar drilling operation. A mounting element 4 is inserted in the hole 2 of the masonry 1 and provided with a plurality of retaining members 3. As can be seen from this Figure, an outer dimension of the mounting element 3 in the direction transverse to an axis thereof, as measured over the retaining members 3, corresponds to the respective dimension of the hole 2. The mounting element 4 has an inner fore 9 provided with ribs 10 and adapted to receive therein a threaded element, such as a wood screw.

The retaining members 3 are formed as flange-like members arranged at an outer surface of the mounting element 4 and extending in a direction transverse to the axis of the latter. They are spaced from one another in an axial direction. The retaining members 3 have a wedge-shaped configuration and taper towards a wall of the hole 2. As mentioned above, they extend in the transverse direction up to the wall of the hole 2. Each of the retaining members 3 has a through-going aperture 8 which may extend in the axial direction.

Means is provided for closing the hole 2 when the mounting element is inserted in the latter. This means includes a flange-like member 5 mounted at a trailing end of the mounting element 4 as considered in the direction of insertion of the mounting element 4 into the hole 2. The closing flange 5 has a through-going opening 7 in which a portion of a feeding device 6 may be received.

The mounting element 4 may be inserted into the hole 2 of the masonry 1 for a depth limited by the flange 5 which, at the same time, closes an inlet of the hole 2. The feeding device is connected to the flange 5 and binding material is injected from the latter through the opening 7 into the hole 2. The binding material flows through the apertures 8 of the retaining members 3 and fills the entire hole 2. In order to ventilate the hole 2, the flange 5 may be provided with a needle-shaped ventilating hole which is not shown in this Figure. When the binding material is hardened, the mounting element 4 will be firmly retained in the hole 2. After this, an article may be mounted to the masonry by means of a wood screw which may be threaded into the inner bore 9 of the mounting element 4.

Figure 3:
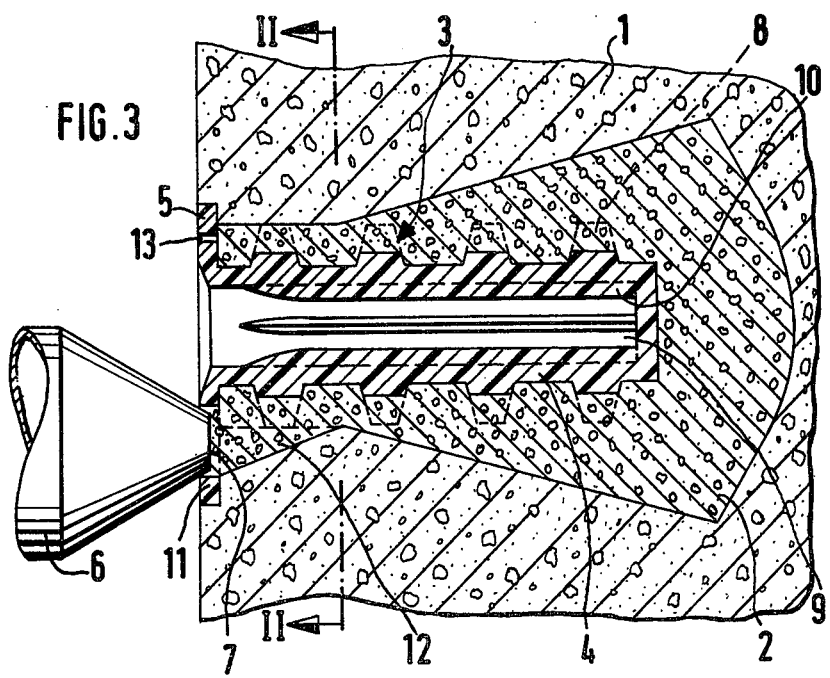
FIG. 3 is a view showing a mounting element inserted in a hole, in accordance with another embodiment of the present invention.
Figure 4:
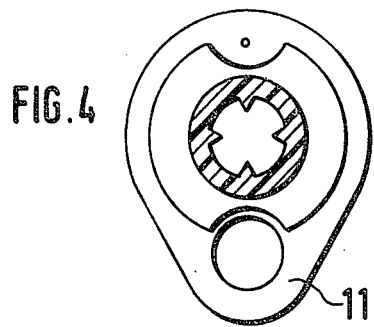
FIG. 4 is a view showing a section of the mounting element taken along the line IV—IV of FIG. 3.

FIGS. 3 and 4 show the mounting element which preferably may be used in the case when a gap between the wall of the hole 2 and an outer face of a body portion of the mounting element 4 is not sufficient for forming a feeding opening 7 in the flange 5. In the above case, the flange 5 of the mounting element 4 has an extension 11 extending in a direction transverse to the axis of the mounting element 4. This extension may be formed as a radial extension of the flange 5. The opening 7 is at least partially formed in the above extension 11. It is to be understood that the opening 11 may be fully formed in the extension 11. A passage 12 may be provided in the masonry, communicating the opening 7 in the flange 5 with the hole 2 of the masonry 1. This passage may be made by piercing of a respective portion of the masonry 1 by a suitable sharp object. The flange 5 may be additionally provided with a needle-shaped ventilating opening 13. A portion of the feeding device 6 is received in the opening 7 formed in the extension 11 of the flange 5.

In the above described embodiments of the invention the portion of the feeding device is inserted into the opening 7 of the flange 5, which opening is offset relative to the inner bore 9 of the mounting element 4 in a direction transverse to the axis thereof.

FIG. 5 shows the mounting element 4 in which the portion of the feeding device 6 may be directly inserted into the inner bore 9 of the mounting element 4. The inner bore 9 of the mounting element 4 is separated by a partition wall 14 into two sections located adjacent to a trailing end and to a leading end of the mounting element 4. The aperture 7 is formed in a wall of the first-mentioned section of the inner bore 9. Two such apertures may be provided, which are circumferentially spaced from one another and preferably located diametrically opposite to one another. The apertures are preferably located immediately adjacent to the flange 5. In such construction the portion of the feeding device 6 is inserted directly into the first-mentioned section of the inner bore and the binding material is injected through this section of the inner bore 9 into the apertures 7 and thereafter into the hole 2 of the masonry 1.

The partition 13 prevents the binding material from penetrating into the second section, that is into the main section of the inner bore 9. At least during low pressure injection processes the binding material is also prevented from penetrating into an open leading end of the second section of the inner bore 9 by a cushion of air formed within the second section. However, during high pressure injection processes it is advisable to close the leading end of the mounting element, such as by a cap 15. The partition wall 14 may be made as an injection-molded membrane which can be destroyed after hardening of the binding material in the hole 2. The partition wall can be, for instance, pierced by a sharp object. After this, the entire inner bore 2 is unobstructed, and an article can be mounted to the masonry 1 by means of a wood screw which can be threaded into the inner bore 9 of the mounting element 4.

In order to position the feeding device 6 against the feeding opening 7 in the case when the mounting element 4 has relatively small dimensions, an additional nozzle 16 may be provided as shown in FIG. 6. The nozzle 16 has a first pin-shaped portion 18 insertable into the inner bore 9 of the mounting element 4, and a second portion having a funnel-shaped opening 17 which can communicate with the aperture 7 in the flange 5 of the mounting element 4. The portions are connected integrally with one another. The first pin-shaped portion 18 of the nozzle 16 has at least one projection 20 engaging in a complementary recess 19 on the mounting element 4. When the nozzle 16 is connected to the mounting element 4, that is, when the first portion 18 of the nozzle 16 is inserted into the inner bore 9 of the mounting element 4, the portion of the feeding device 6 is inserted into the opening 17 of the second portion of the nozzle 16 and the binding material is injected through the aperture 7 into the hole 2 of the masonry. In order to thread a screw of an article to be mounted into the inner bore 9, the nozzle 16 is withdrawn therefrom.

The mounting element 4 shown in FIG. 7 is provided with an additional sheath 21 which can be pulled over the retaining members 3 of the mounting element 4. The sheath 21 has an outer diameter corresponding to the diameter of the hole 2 in the masonry 1. In order to insert the mounting element 4 into the hole 2, the sheath 21 is pulled over the retaining members 3 of the mounting element and the thus-assembled structure is inserted into the hole 2, until the flange 5 abuts against the masonry 1 and closes the hole 2. In this position the sheath 21 extends into the hole 2 and bridges a gap which is formed between the masonry 1 and an additional structure 22 mounted thereto. The feeding opening 7 is so arranged in the flange 5 that it communicates with a cavity formed between an outer surface of a body portion of the mounting element 4 and an inner surface of the sheath 21.

It will be understood that each of the elements described above, or two or more together, may also find a useful application in other types of constructions differing from the types described above.

While the invention has been illustrated and described as embodied in an arrangement for anchoring a mounting element in a hole of a masonry or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for anchoring a mounting element in a hole of a masonry or the like by the use of binding material, a combination comprising a sleeve-shaped mounting element insertable into the hole and having an axis and an inner bore adapted to receive therein a threaded element; a plurality of retaining members on said mounting element for fixing the latter in the hole and each extending in a direction substantially transverse to said axis of said mounting element and having a through-going aperture so as to permit the binding material to flow therethrough, said retaining members tapering towards a wall of the hole and having a wedge-shaped cross-section; and means for closing the hole so as to prevent backflow of the binding material and being provided with a through-going opening for feeding the binding material into the hole.

2. The combination as defined in claim 1, wherein said mounting element has a leading end portion and a trailing end portion as considered in the direction of insertion thereof into the hole, said closing means being formed by a flange member arranged at said trailing end portion of said mounting element, said feeding opening being formed in said flange member, said flange member having an extension extending in the direction transverse to said axis and outwardly beyond the wall of the hole, said feeding opening being at least partially formed in said extension of said flange member.

3. The combination as defined in claim 2, wherein said extension extends in a radial direction.

4. The combination as defined in claim 1, wherein said retaining members extend up to the wall of the hole.

5. The combination as defined in claim 1, wherein said mounting member has a leading end portion and a trailing end portion as considered in the direction of insertion thereof into the hole; and further comprising a destructable partition wall separating said inner bore of said mounting element into first and second sections adjacent to said trailing end and leading end portions thereof, respectively, said feeding opening being formed in said mounting element so as to communicate said first section of said inner bore thereof with the hole of the masonry, so that the binding material flows from said first section of said inner bore into the hole while being prevented from entering said second section of said inner bore by said partition wall, which latter may be destroyed after filling the hole with the binding material.

6. The combination as defined in claim 5, wherein said closing means includes a flange member arranged at said trailing end portion of said mounting member, said feeding opening being located immediately adjacent to said flange member.

7. The combination as defined in claim 5, wherein said mounting element has a second such feeding opening circumferentially spaced from said first-mentioned feeding aperture.

8. The combination as defined in claim 9, wherein said feeding openings are located diametrically opposite relative to one another.

9. The combination as defined in claim 5, wherein said partition is of one-piece with said mounting element.

10. The combination as defined in claim 5, wherein said leading end portion of said mounting element has an open leading end; and further comprising means for closing said leading end of said leading end portion.

11. The combination as defined in claim 1, wherein said mounting element has a leading end portion and a trailing end portion as considered in the direction of insertion thereof into the hole, said closing means being formed by a flange member arranged at said trailing end portion of said mounting element, said feeding opening being formed in said flange member; and further comprising a nozzle member having one section insertable into said inner bore of the mounting member so as to fix said nozzle member, and another section provided with an opening which is adapted to receive a feeding device and to communicate with said feeding opening of the flange member when said nozzle member is in the fixed condition.

12. The combination as defined in claim 11, wherein said one section of said nozzle member is pin-shaped and adapted to engage a wall of said inner bore of said mounting element.

13. The combination as defined in claim 11, wherein said opening of said other section of said nozzle member is funnel-shaped so as to correspond to the shape of a tip of the feeding device.

14. The combination as defined in claim 11; and further comprising means for fixing said one section of said nozzle member in said inner bore of said mounting member, formed in said one section of said nozzle member and in a wall of said inner bore of said mounting element.

15. The combination as defined in claim 14, wherein said fixing means includes interengaging projections and recesses.

16. The combination as defined in claim 1, wherein said mounting element has a leading end portion and a trailing end portion as considered in the direction of insertion thereof into the hole, said closing means being formed by a flange member arranged at said trailing end portion of said mounting element, said feeding opening being formed in said flange member; and further comprising a sheath extending from said flange member over a portion of the length of said mounting element and located against a wall of the hole of the masonry or the like.

17. The combination as defined in claim 16, wherein an additional structure is mounted on the masonry or the like and forms a gap therebetween, said sheath bridging the gap between the masonry or the like and the additional structure so as to prevent escaping the binding material through the gap.

* * * * *